3,577,313
CONDENSATION PRODUCTS OF AMINES WITH EPIHALOHYDRINS
Justin C. Bolger, Needham, Hugh Evan McCollum, Cambridge, and Robert William Hausslein, Lexington, Mass., assignors to Amicon Corporation, Lexington, Mass.
No Drawing. Filed Oct. 16, 1967, Ser. No. 675,354
Int. Cl. D21d 3/00; D21h 3/36
U.S. Cl. 162—164          7 Claims

ABSTRACT OF THE DISCLOSURE

A condensation product, with an epihalohydrin, of a polyalkylene polyamine having the composition $$NH_2-(A-NH)_n-H$$

in which A represents a straight chain alkylene group having 4 to 8 carbon atoms and $n$ is a number from 2 to 6, and a second amino compound selected from the class consisting of ammonia; hydrazine; and the polyethylene polyamines, polypropylene polyamines, alkanolamines, and ethylamine alkanolamines having at least two hydrogen atoms attached to amino nitrogen, having a miscibility with water of at least 20% by weight of amino compound, and having a $pK_a$ at 25° C. of at least about 9.0.

---

This invention relates to condensation products of polyalkylene polyamines with epihalohydrins.

Condensation products of polyethylene polyamines, such as ethylene diamine, with epihalohydrins, are known flocculating agents; however, these condensates are extremely difficult to prepare in high molecular weights because they tend to form insoluble gels, and the low molecular weight condensates are not highly effective flocculating agents. Condensates of certain high molecular weight polyalkylene polyamines, particularly, those having the general formula $NH_2-(A-NH)_n-H$, where A represents a straight chain alkylene group having from 4 to 8 carbon atoms and $n$ is a number having an average value, including integral as well as mixed numbers, from 2 to 6, with epihalohydrins, have also been prepared; however, in certain flocculating applications, such as the retention of pigment on paper pulp, these condensates are not highly effective.

It is an object of this invention to provide a condensate of polyalkylene polyamines with an epihalohydrin which has superior flocculating properties. Another object of this invention is to provide a new flocculating agent which is particularly effective as a pigment retention aid, such as in the retention of pigment on paper pulp. Another object of this invention is to provide a new water-soluble polymeric flocculating agent.

The invention features the condensation product with an epihalohydrin of a polyalkylene polyamine having the composition $NH_2-(A-NH)_n-H$ in which A represents a straight chain alkylene group having from 4 to 8 carbon atoms and $n$ is a number having an average value from 2 to 6, including integral as well as mixed numbers, and a second amino compound selected from the class consisting of ammonia; hydrazine; and the polyethylene polyamines, polypropylene polyamines, alkanolamines, and aminoethyl alkanolamines having at least two hydrogens attached to amino nitrogen, as explained below, having a miscibility with water of at least 20% by weight of amino compound, and having a $pK_a$ at 25° C. of at least 9.0. Prefearbly, per 0.35 gram moles of polyalkylene polyamine, in the range of about 0.05 to 3.5 gram moles of second amino compound and in the range of about $0.20+0.40x$ to $0.40+0.60x$ gram moles of an epihalohydrin, where $x$ is the number of primary amine nitrogens in each molecule of said second amino compound (e.g., for ethylene diamine, $x=2$; for ethanolamine, $x=1$), are used.

Some examples of suitable polyalkylene polyamines are di (tetramethylene) triamine, tri (tetramethylene) tetramine, etc., and corresponding poly (pentamethylene) polyamines, poly (hexamethylene) polyamines, poly (heptamethylene) polyamines, and poly (octamethylene) polyamines. A mixture of such compounds may also be advantageously used; for example, a reactant poly (hexamethylene) polyamine may consist of a mixture of di (hexamethylene) triamine, tri (hexamethylene) tetramine, tetra (hexamethylene) pentaamine, etc. A commercial technical grade polyalkylene polyamine preparation containing, for example, a large proportion of di (hexamethylene) triamine along with lesser amounts of other suitable polyamines, is also a suitable polyamine starting material.

Among the preferred second amino compounds are included ammonia; hydrazine; and polyethylene polyamines such as ethylene diamine, diethylene triamine, triethylenetetraamine, etc., polypropylene polyamines such as propylene diamine, dipropylene triamine, etc.; alkanolamines such as ethanolamine, propanolamine, etc.; and substituted alkanolamines such as aminoethyl ethanolamine, etc. However, to be operable, the second amino compound must have at least two hydrogens attached to amino nitrogen, i.e., at least one primary amino group ($NH_2-$), or at least two secondary amino groups ($-NH-$) (tertiary amino groups are unreactive); it must have a miscibility with water of at least 20% by weight of amino compound; and it must have a $pK_a$ at 25° C. of at least 9.0 (preferably at least 9.5). The second amino compound must also, of course, be free of functional groups which would react with the epihalohydrin and hence interfere with the condensation reaction.

The epihalohydrin is preferably epichlorohydrin, but both epibromohydrin and epiiodohydrin are aslo suitable.

Although the proportions of reactants should preferably lie within the previously described ranges, more preferably the reactants should lie within the following ranges, per 0.35 gram moles of polyalkylene polyamine: 0.15 to 0.85 gram moles of second amino compound and $0.25+0.45x$ to $0.30+0.55x$ gram moles of epihalohydrin, where, as before, $x$ is the number of primary amine nitrogens ($-NH_2$) in each molecule of the second amino compound. The reaction is preferably carried out in an aqueous medium, the amount of water being at least sufficient to avoid formation of a gel, but not so excessive as to unduly slow the reaction rate of the condensation.

In a preferred method, the polyalkylene polyamine and second amino compound, along with water, in predetermined proportions, are introduced into a reaction vessel and mixed. Preferably, the reactants are heated to a temperature in the range of about 60°–85° C.; however, the reaction may be carried out at any temperature from room temperature to slightly below the boiling point of water. The epihalohydrin is then added, preferably dropwise or very slowly, while stirring and, advantageously, while maintaining the temperature of the reaction mixture within the previously described preferable temperature range. When all the epihalohydrin has been added, the reaction mixture is stirred for about 10 minutes more and allowed to cool. An acid, such as hydrochloric acid, is then added until the pH of the mixture is reduced to about 5 to 6; and the mixture is then diluted with distilled water. The addition of acid and the water dilution serve, in a manner well known in the art, to stop the polymerization reaction and prevent further residual polymerization. The condensation product obtained is a cationic polymer, soluble in water up to a pH of about 11, forming a tan to dark brown aqueous solution.

Although in the preferred method the total charge of polyamines is introduced prior to the addition of epihalohydrin, it will be understood that the reactions may be added in any order or amounts, so long as the amount of epihalohydrin does not at any time substantially exceed the previously discussed stoichiometric proportion.

For use as a flocculant, the solution obtained is typically diluted further with about 5 to 50 parts by volume water, per one part solution, the amount of dilution depending on the amount of solid in the material to be flocculated. Generally, in the range of 0.001 to 2 parts, by weight, of the undiluted solution is used per 100 parts, by weight, of solids in the material to be flocculated.

The following non-limiting examples are illustrative of the present invention:

EXAMPLE 1

The following ingredients were introduced into a one liter reaction kettle:

72 grams of a technical grade of a poly (hexamethylene) polyamine of the general formula $$NH_2-(A-NH)_n-H$$

wherein A represents a straight chain alkylene group having 4 to 8 carbon atoms and $n$ has an average value of about 2.7, containing about 50% by weight of bis (hexamethylene) triamine, about 35% by weight of a mixture of higher molecular weight polyamines such as tri (hexamethylene) tetraamine, tetra (hexamethylene) pentaamine, penta (hexamethylene) hexamine, etc., wherein $n$ has a value of 3 and greater, and about 10% of a mixture of hexamethylenediamine, adiponitrile, ε-aminocapronitrile, and 2- cyanocyclopentylidenimine;
14.4 grams of ethylenediamine (92% purity—a commerical grade); and,
62 grams of distilled water.

The ingredients were mixed and heated to 75° C. There were added 42.5 grams of epichlorohydrin (technical grade) dropwise with good stirring, while maintaining the temperature of the reaction mixture between 65° and 80° C. The addition took about 250 minutes. The reaction mixture was then allowed to cool for 10 minutes from 80° to 75° C. while being continually stirred. The pH of the mixture was then decreased to 5.5 with 37% hydrochloric acid, and the mixture was diluted to 20% polymer solids with distilled water. The viscosity of this solution was 40 cp. at 25° C., as measured on a Brookfield LVT viscometer using a No. 2 spindle at 30 r.p.m.

EXAMPLE 2

The following ingredients were introduced into a one liter reaction kettle:

72 grams of the technical grade poly (hexamethylene) polyamine described in Example 1;
14.4 grams of ethanolamine; and,
62 grams of distilled water.

The ingredients were mixed and heated to 80° C. There were then added 33.5 grams of epichlorohydrin (technical grade) dropwise with good stirring, while maintaining the reaction temperature between 68° and 82° C. The addition took 190 minutes. After the addition of the epichlorohydrin was complete, the reaction mixture was allowed to cool for 5 minutes from 80° C to 71° C. At this time 60 grams of 18.5% hydrochloric acid were added with stirring. The acid addition reduced the pH of the reaction mixture to approximately 8.5 and raised the temperature to 81° C. The mixture was again allowed to cool for 8 minutes from 81° C. to 71° C. The mixture was then acidified to a pH of approximately 6 with 37% hydrochloric acid and diluted to 20% polymer solids with distilled water. The viscosity of this solution was 30 cp. at 25° C.

EXAMPLE 3

The following ingredients were introduced into a one liter reaction kettle:

72 grams of the technical grade poly (hexamethylene) polyamine described in Example 1;
24 grams of ethylenediamine (92% purity); and,
62 grams of distilled water.

The ingredients were mixed and heated to 78° C. There were added 59 grams of epichlorohydrin (technical grade) dropwise with good stirring, while maintaining the temperature of the reaction mixture between 75° and 85° C. The addition took 230 minutes. After the addition of the epichlorohydrin was complete, the reaction mixture was cooled for 10 minutes from 78° C. to 67° C., acidified to a pH of 5.5 with 37% hydrochloric acid, and diluted to 20% polymer solids with distilled water. This solution had a viscosity of 30 cp. at 25° C.

EXAMPLE 4

To demonstrate the usefulness of the product of Example 1 as a pigment retention aid, the following paper pulp furnish composition was prepared:

80% hardwood, 20% softwood bleached kraft pulp, (0.90% solids)—100 ml.
Fortified rosin size—0.4% (by weight of solid pulp)
$TiO_2$ pigment—5.5% (by weight of solid pulp)
Alum—1.1% (by weight of solid pulp)
Water to make 400 ml.
Sufficient sulfuric acid was added to adjust the ph to 4.5.

A conventional polyamine-epichlorohydrin condensate was also prepared, for purposes of comparison, in a reaction mix of 144 grams of the technical grade poly(hexamethylene) polyamine described in Example 1, 124 grams of water, 35.45 grams of epichlorohydrin and 34.6 grams of 50% aqueous NaOH. Condensation was stopped when the viscosity of the product at 25° C. reached 30 cp. The untreated pulp composition and those treated with the above condensate and with the condensate of Example 1 were filtered through eight layers of cheesecloth (Grade 90), and the optical density of the resultant filtrate was measured by a conventional spectrophotometer at a 525-microns wave length. The lower optical densities indicate greater pigment retention. The results are summarized below:

Retention aid added: Filtrate optical density
3.8 ml. of 0.01% solution of product of Example 1 _____ 0.17
3.8 ml. of 0.01% solution of conventional polyamine-epichlorohydrin retention aid _____ 0.25
Untreated pulp (no retention aid) _____ 0.59

The difference in effectiveness between the product of Example 1 and the conventional polyamine epichlorohydrin retention aid increased markedly as the amount of retention aid used was increased.

Similar results were obtained using the product of Example 3.

EXAMPLE 5

The same treatment as that described in Example 4 was performed on the following paper pulp furnish composition:

|  | Ml. |
|---|---|
| 80% Hardwood, 20% softwood bleached kraft pulp (0.75% solids) | 100 |
| Fortified rosin size (0.36% dispersion) | 3.1 |
| Kaolin (10% dispersion) | 2.1 |
| $TiO_2$ pigment (5.25% dispersion) | 1.0 |
| Alum (1.0% dispersion) | 0.8 |

Again, the pH was adjusted to 4.5 with sulfuric acid.

The following results were obtained:

| Retention aid added: | Resultant optical density |
|---|---|
| 5.4 ml. of 0.01% solution of product of Example 1 | 0.27 |
| 5.2 ml. of 0.01% solution of product of Example 3 | 0.28 |
| 6.6 ml. of 0.01% solution of the conventional polyamine-epichlorohydrin condensate described in Example 4 | 0.49 |
| Untreated pulp (no retention aid) | 1.10 |

Other embodiments will occur to those skilled in the art and are within the following claims:

What is claimed is:

1. A condensation product with an epihalohydrin of a polyalkylene polyamine having the composition $$NH_2-(A-NH)_n-H$$

in which A represents as traight chain alkylene group having from 4 to 8 carbon atoms and $n$ is a number having an average value from 2 to 6, and 0.05 to 3.5 gram moles, per 0.35 gram moles of said polyalkylene polyamine, of a second amino compound selected from the class consisting of ammonia, hydrazine, and polyethylene polyamines, polypropylene polyamines, alkanolamines, and aminoethyl alkanolamines, having at least two hydrogens attached to amino nitrogen, having a miscibility with water of at least 20% by weight of amino compound, and having a pK$_a$ at 25° C. of at least about 9.0.

2. A condensation product of a polyalkylene polyamine having a composition $NH_2-(A-NH)_n-H$ in which A represents a straight chain alkylene group having from 4 to 8 carbon atoms and $n$ is a number having an average value from 2 to 6, and 0.05 to 3.5 gram moles, per 0.35 gram moles of said polyalkylene polyamine, of a second amino compound selected from the class consisting of ammonia, hydrazine, and polyethylene polyamines, polypropylene polyamines, alkanolamines, and aminoethyl alkanolamines, having at least two hydrogens attached to amino nitrogen, having a miscibility with water of at least 20% by weight of amino compound, and having a pK$_a$ at 25° C. of at least about 9.0, with 0.20+0.40$x$ to 0.40+0.60$x$ gram moles of an epihalohydrin (where $x$=no. of primary amine nitrogens in each molecule of said second amino compound), per 0.35 gram moles of said polyalkylene polyamine.

3. The condensation product of claim 1 wherein said epihalohydrin is epichlorohydrin.

4. The condensation product of claim 1 wherein second amino compound is ethylene diamine.

5. The condensation product of claim 1 wherein said second amino compound is ethanolamine.

6. A process for effecting pigment retention in paper during the formation thereof, said process comprising the step of adding to paper furnish prior to formation of said paper an effective amount of a condensation product formed of an epihalohydrin with (1) a polyalkylene polyamine of the formula $NH_2-(A-NH)_n-H$, in which A represents a straight-chain alkylene group having from 4 to 8 carbon atoms and $n$ is a number having an average value from 2 to 6, and (2) 0.05 to 3.5 gram moles, per 0.35 gram moles of said polyalkylene polyamine, of a second amino compound selected from the class consisting of ammonia, hydrazine; and polyethylene polyamines, polypropylene polyamines, alkanolamines, and aminoethyl alkanolamines, having at least two hydrogens attached to amino nitrogen, having a miscibility with water of at least 20% by weight of amino compound and having a pK$_a$ at 25° C. of at least about 9.0.

7. A process defined in claim 1 wherein said pigment being retained is titanium dioxide.

References Cited
UNITED STATES PATENTS

| 2,969,302 | 1/1961 | Green | 162—164 |
| 3,248,353 | 4/1966 | Coscia | 162—164 |
| 3,258,393 | 6/1966 | Woodberry et al. | 162—164 |

FOREIGN PATENTS

| 642,260 | 6/1962 | Canada | 162—164 |
| 729,517 | 3/1966 | Canada | 162—164 |

HOWARD R. CAINE, Primary Examiner

R. H. ANDERSON, Assistant Examiner

U.S. Cl. X.R.

162—182; 260—2